Sept. 22, 1959 J. WALLACE ET AL 2,905,516

ARTICLE FEEDING APPARATUS

Filed Jan. 3, 1955 4 Sheets-Sheet 1

INVENTORS.
John Wallace.
Donald R. Lane.
BY
Benjamin J. Barish
ATTORNEY.

Sept. 22, 1959 J. WALLACE ET AL 2,905,516

ARTICLE FEEDING APPARATUS

Filed Jan. 3, 1955 4 Sheets-Sheet 2

INVENTORS
John Wallace.
Donald R. Lane.
BY
Benjamin J. Barish
ATTORNEY.

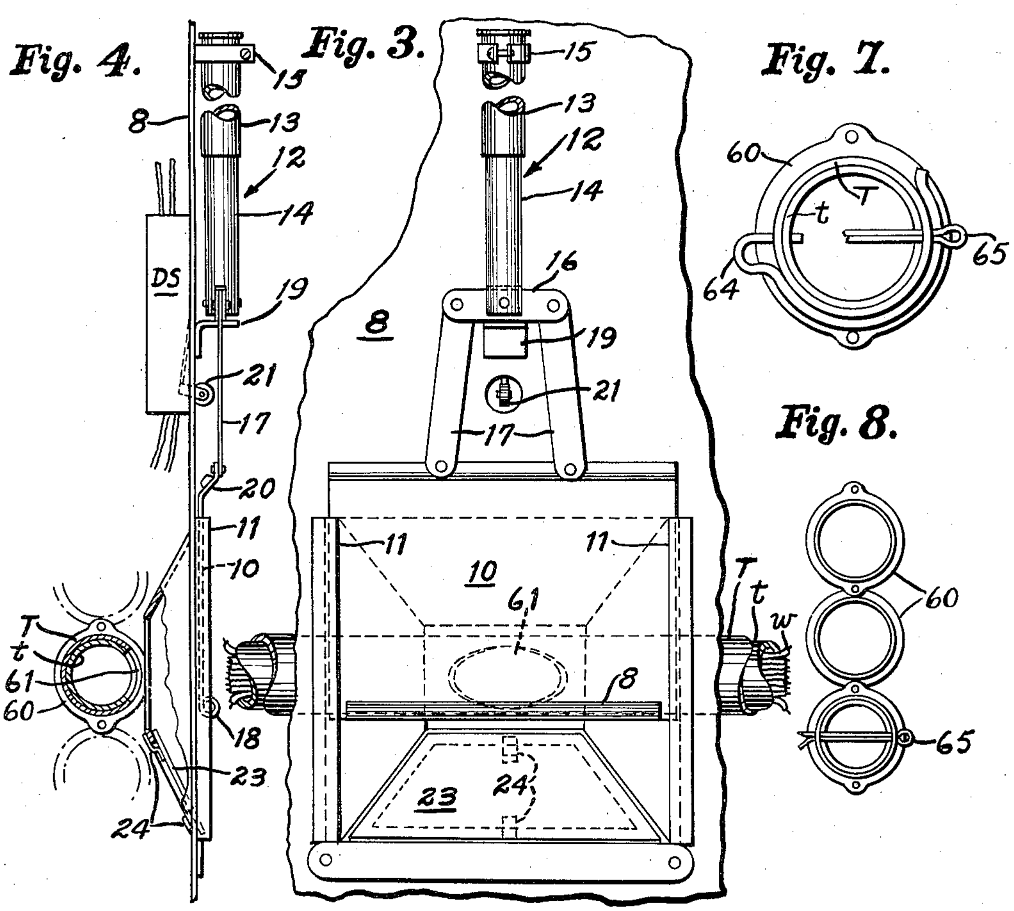
Fig. 4. Fig. 3. Fig. 7. Fig. 8.
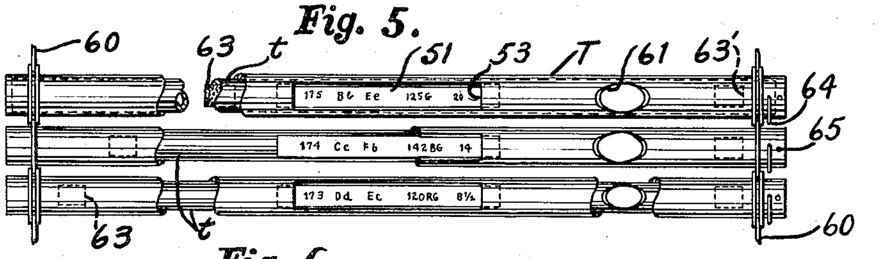
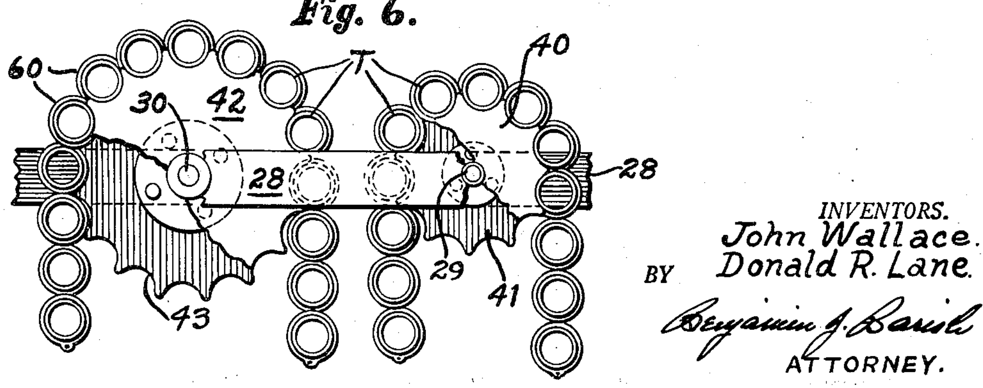
Fig. 6.
INVENTORS.
John Wallace.
Donald R. Lane.
BY
Benjamin J. Barish
ATTORNEY.

ARTICLE FEEDING APPARATUS

Filed Jan. 3, 1955 4 Sheets-Sheet 4

INVENTORS.
John Wallace.
Donald R. Lane.
BY
Benjamin J. Barish
ATTORNEY

United States Patent Office 2,905,516

Patented Sept. 22, 1959

2,905,516

ARTICLE FEEDING APPARATUS

John Wallace and Donald R. Lane, Detroit, Mich., assignors to Burroughs Corporation, Detroit, Mich., a corporation of Michigan Application January 3, 1955, Serial No. 479,478

6 Claims. (Cl. 312—97)

This invention relates to article feeding apparatus and in particular to such apparatus which is especially useful for feeding wires in assembling electrical harnesses.

Unless printed circuit techniques can be used in the manufacture of an electrical device involving complicated circuitry, the wires or conductors to the various components are generally assembled into a harness, to facilitate the connection of each conductor to its respective component and to provide a compact, traceable assembly of conductors. The harness is designed according to a predetermined pattern that depends on the electrical circuit and the position of its components, with each conductor beginning and terminating at specified points. After the conductors are thus laid out according to the pattern, they are bound together, as by lacing, to maintain their relationship.

The harnesses are generally assembled on a harness board that is pre-marked according to the pattern, and the assembler must place all the wires of given types and lengths in specified position on the harness board. This procedure generally requires that for each wire the assembler first refer to a set of instructions to determine the type and length of wire to be laid, cut the required length from the specified spool or obtain a pre-cut wire from the proper bin, again refer to the instructions for the position of the wire on the harness board, and then place the wire in its proper position. The procedure is a long and tedious one, and tends to promote errors in the wire selected or the position on the harness board that it is placed. Also, where a large number of wires are involved, as in the hundreds, the individual wires cannot be made readily accessible to the assembler, and moreover would require a large amount of space.

It is a general object of this invention to provide compact and efficient article feeding apparatus.

Another object of this invention is to provide apparatus for feeding wires especially useful in assembling harnesses for electrical devices.

A further object of this invention is to provide apparatus for feeding a large number of articles, such as wires, in a predetermined sequence, the feeding of each being controlled by the operator of the apparatus.

A further object of this invention is to provide efficient and compact article feeding apparatus which can house and feed a large number of articles to make each readily accessible in a predetermined sequence and which takes up relatively little space.

A still further object of this invention is to provide apparatus for feeding articles one at a time which will display information peculiarly concerning the individual articles as they are fed.

These and other objects and advantages, which will become apparent as the description proceeds, are obtainable by the article feeding apparatus of this invention. For purposes of this description, the invention is embodied in apparatus for feeding wires of different types and lengths, which is especially useful in assembling electrical harnesses. The wire feeding apparatus embodying the invention generally comprises an endless chain of wire-carriers, in the form of tubes, enclosed within a housing having a wire-access opening and an information-display opening. Each of the wire-carrying tubes is provided with an opening alignable with the access opening of the housing enabling the harness assembler to procure a wire from the tube, and indicia alignable with the information-display opening instructing the assembler where to position the wire on the harness board. A normally closed door covering the access opening controls the advancement of the wire-carrying tubes and also, thereby, the corresponding change in the information displayed. After the tubes are all loaded with the proper wires and in the predetermined sequence for assembly on the harness board, the assembler merely opens the door to procure each wire, the machine automatically presenting to him the proper wire and the correct instruction for its placement on the harness board.

Wire feeding apparatus for use in assembling harnesses constructed in accordance with the invention is illustrated in the drawings, it being understood that this application of the invention is an illustrative embodiment only and that the invention is applicable to other article feeding apparatus.

In the drawings illustrating a wire feeding apparatus constructed in accordance with the invention:

Fig. 3 is an enlarged front elevational view of the door covering the access opening in the housing;

Fig. 4 is a side elevational view, partly in section, of the structure of Fig. 3;

Fig. 5 is a front elevational view of several of the wire-carrying tubes;

Fig. 6 is a side elevational view of the tube discs supporting the wire-carrying tubes;

Fig. 7 is an enlarged detail view of an end of one wire-carrying tube;

Fig. 8 is an enlarged detail view of the tube links;

Figure 1:
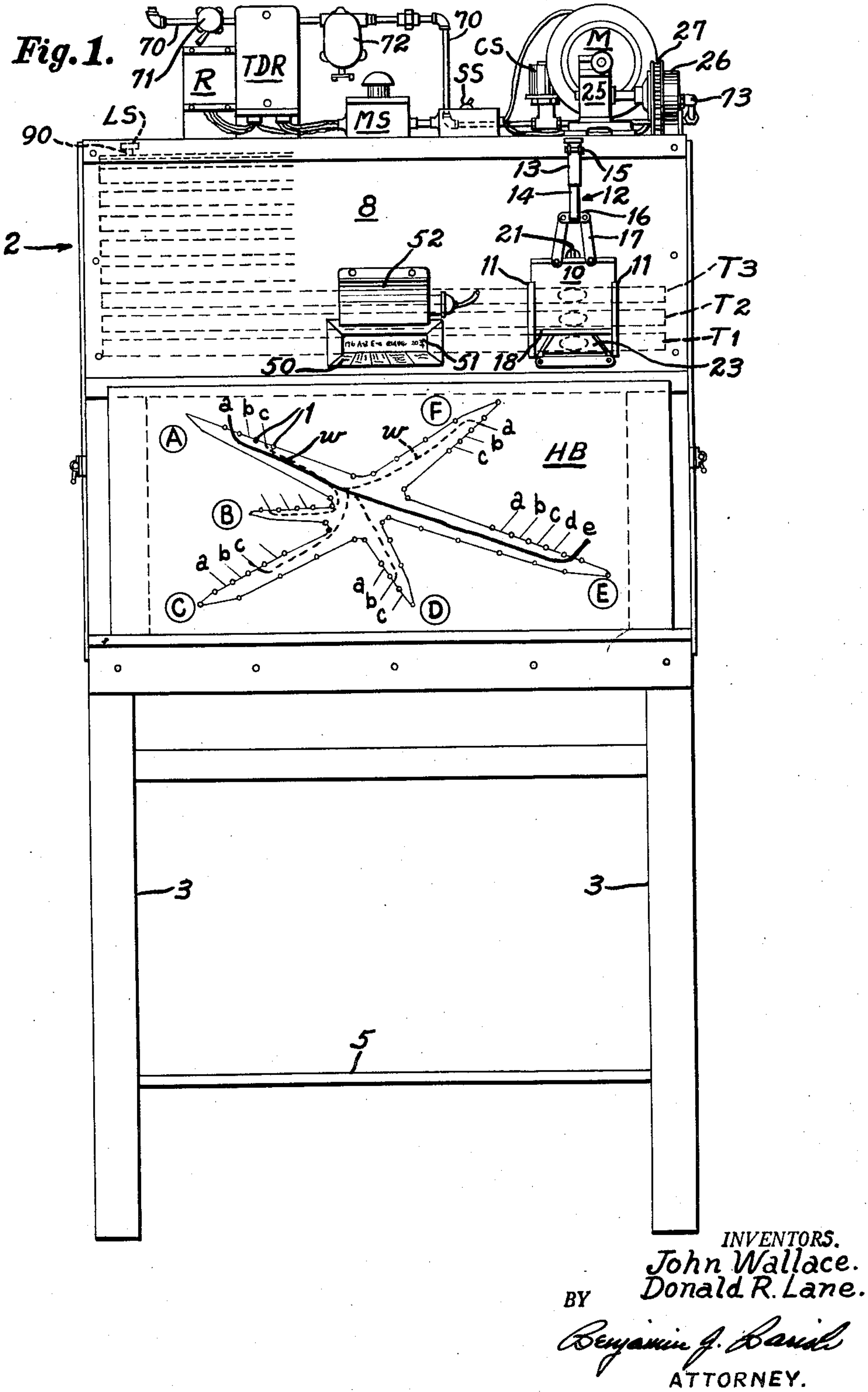
Fig. 1 is a front elevational view.
Figure 2:
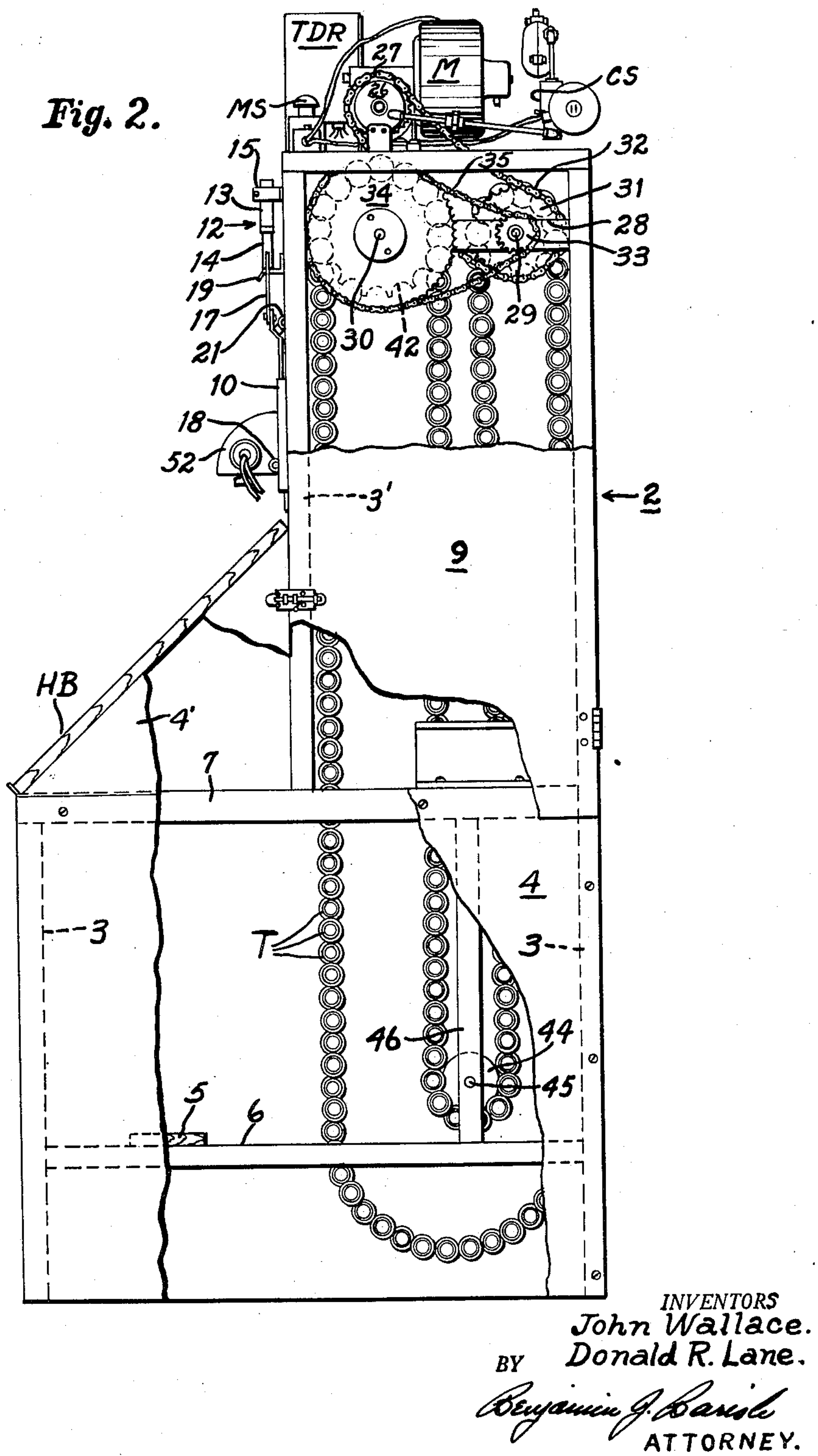
Fig. 2 is a side elevational view with parts of the housing broken away to show its contents.

Referring to Figs. 1 and 2, the housing 2 of the wire feeding apparatus encloses an endless chain of tubes T, each of which carries wires *w* of given lengths and color-codings in a predetermined sequence, the wires to be positioned on a harness board HB resting on the front of the apparatus. The harness board HB is marked in accordance with a pattern that has been designed for the specific electrical circuit and arrangement of its components with which the harness is to be used. The outline of the assembled harness may be drawn on the board, divided into a number of areas A to E, each area in turn being divided into a number of stations *a*, *b*, *c*, etc. Each of the wires *w* is to be placed in its correct position on the harness board beginning at one area and station and terminating at another area and station, and is retained in its position by pins, or clips, 1 until the complete assembly is bound together as by lacing.

Housing 2 is constructed of vertical frame members 3 to which lower panels 4 are secured on three sides thereof, the lower part of the housing being open at the front. A cross-panel 5 is secured to horizontal braces 6 supported by the frame members, reinforcing the structure and also serving as a foot rest for the assembler. Rear frame members 3 extend the full height of the housing, whereas the front frame members terminate to form a table 7 for supporting the harness board HB, and additional frame members 3′ continue for the full height of the housing. The upper frame members are enclosed by front and rear panels 8 and side panels 9, the latter being hingedly supported to provide access into the housing. The harness board HB is supported in an inclined position by the top 7 of the lower housing and front panel 8 of upper housing, and aprons 4′ may be provided at each end of the housing to shield this area. Aprons 4′ may be extensions of panels 4 or separate panels altogether.

The front panel 8 of the housing facing the assembler is formed with an opening conveniently positioned to permit access to a wire-carrying tube aligned with the opening. As best seen in Figs. 1, 3 and 4, this opening is normally masked by a cover, or door, 10 vertically slideable between a pair of channel members 11 bordering the opening. The door 10 is supported on the housing by a dashpot 12, the fixed part 13 of which is secured to the housing, as by clamp 15, and the movable part 14 of which is secured to the door 10 by a cross-arm 16 and a pair of depending arms 17. The lower edge of the door may be beaded, as shown at 18, Fig. 4, to facilitate raising the door by the assembler. A lug 19, secured to the housing, limits the downward movement of the door by engaging the cross-arm 16 of the dashpot. Switch DS is disposed within the housing with its actuator 21 extending through an aperture in panel 8 into the path of movement of the door.

As door 10 is manually raised by the assembler to procure a wire from one of the tubes, an inclined surface 20 of the door engages the switch actuator 21 of switch DS to close a circuit which conditions the tube advancing means for operation. After the wire is removed from its tube, the door is permitted to drop down retarded by dashpot 12, releasing the switch actuator 21, thus opening the aforementioned circuit and closing another circuit to actuate the tube advancing means. The latter advances the tubes until the next tube is aligned with the access opening, and then automatically stops. This operation will be described in more detail in the description of the electrical circuitry and the overall operation of the apparatus.

A motor M drives the chain of tubes through suitable speed-reduction gearing 25, and a chain and sprocket arrangement best shown in Fig. 2. In the illustrated embodiment, the motor is a constantly running type and the advancement of the wire-carrying tubes is controlled by a clutch mechanism 26, later described, coupling the motor to a drive chain-sprocket 27. The motor, clutch, and controls therefor may be disposed on top of the housing 2 as shown in Figs. 1 and 2. Within the housing are a pair of cross-bars 28, one at each end of the housing, and a pair of parallel shafts 29 and 30 journaled on the cross-bars and extending through the length of the housing. A sprocket 31 is fixed to shaft 29 and is coupled to drive-sprocket 27 by a roller chain 32. Also fixed to shaft 29 and driven thereby is another sprocket 33 adapted to drive a further sprocket 34 through roller chain 35, sprocket 34 being fixed to shaft 30. Shaft 29 has fixed thereto at one end a disc 40 and at its opposite end another disc 41. Similarly fixed to opposite ends of shaft 30 are a pair of discs 42 and 43. (See Fig. 6.) Each of these discs is grooved along its periphery to support the wire-carrying tubes making up the endless tube chain.

The tube chain is composed of a number of wire-carrying tubes, T, one for each wire *w* to be included in the harness assembly. The drawings illustrate approximately 185 tubes in the form of an endless chain, the chain being supported and driven by the grooved discs 40, 41 and 42, 43. A depending loop of the chain may be looped around idler discs 44, similarly grooved, fixed at opposite ends of a shaft 45 journaled on a support bar 46 in the lower part of the housing (see Fig. 2). It will be thus observed that the motor M will drive the tube chain, controlled by the clutch 26, through the chain and sprocket arrangement to advance successive tubes T into alignment with the access opening in the housing normally covered by door 10.

Figure 9:
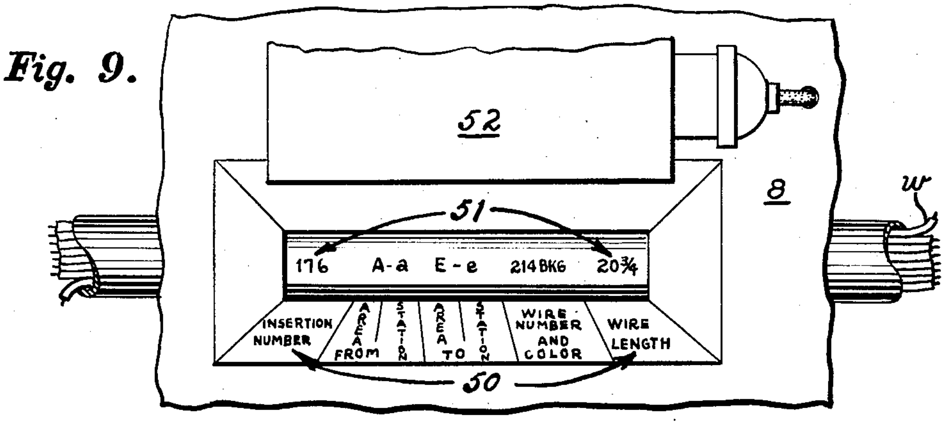
Fig. 9 is an enlarged front elevational view of a detail of the housing and a wire-carrying tube, illustrating the information presented to the harness assembler.

The front panel 8 of housing 2 is also provided with an opening displaying information concerning the position that a wire *w* removed from a tube T is to be placed on the harness board. This is best seen in Fig. 9 which illustrates a wire-carrying tube aligned with this opening. The opening is bordered by markings or indicia 50 on panel 8 relating to the identification of the wire and the position it is to be placed on the harness board. Thus, the indicia 50 may include the wire's insertion number, its position "from" and "to" the area and station on the harness board, the wire type and color coding, and the wire length. Each of the wire-carrying tubes is also provided with indicia 51 identifying the particular wire carried by that tube as to its insertion number, position on the harness board, etc. Thus, as each tube is aligned with this opening, information is displayed to the assembler informing him as to the type of wire and the position it is to be placed on the harness board HB.

Fig. 9 illustrates a typical instruction displayed to the assembler concerning a wire *w* that he has just removed from a tube through the access opening, and Fig. 1 illustrates the position that the wire is to be placed on the harness board. The first marking informs the assembler that the wire is the 176th one in the assembly. This information is also useful in refilling the tubes in the chain, since that particular tube would be the 176th one in the sequence. The next two markings instruct the assembler that the wire *w* is to be placed from area A station *a* to area *e* station *e*. Fig. 1 illustrates the wire so placed. The next markings inform him that the wire number is "214" and the color coding is black-green. The last marking gives him the wire length as being 20¾". Of course, any suitable indicia and arrangement thereof could be used to inform or instruct the assembler concerning the wires *w* in that particular tube. A light fixture 52 may be mounted on the housing to illuminate this indicia.

Each of the tubes T in the chain is supported by tube link 60, illustrated in Figs. 7 and 8. The tubes themselves may be made of any suitable material, such as plastic or metal. In the disclosed embodiment each tube T carries an inner tube *t* in which the wires are disposed (see Fig. 5). This facilitates refilling of tubes T by removing the empty inner tubes *t* and inserting pre-loaded tubes, which can be pre-filled and kept in stock. Where pre-loaded tubes are to be used, both the inner and outer tubes, *t* and T respectively, would be provided with aligned openings 61 permitting access to the wires therein. The inner tube *t* carrying the wires would be further provided with the indicia 51 concerning the wires in the tube and the outer tube T would be formed with a slot 53 aligned with the indicia to permit viewing thereof. A cork 63 is inserted at one end of each tube *t* and positioned along its length so that the wires to be carried by the tube terminate with their ends accessible through openings 61. Another cork 63′ may be inserted at the opposite end of each tube. Where the wires are longer than it would be practical to make the tubes, the wires may be doubled and their midportions made accessible through openings 61.

The outer tubes T are non-rotatably retained in their tube links 60 by a press-fit although it may be desirable to provide additional means such as retainer clips. Inner tubes *t* are non-rotatably retained within outer tubes T by clips 64 (Fig. 7) passing through apertures at one end of both tubes. Cotter pins 65 close off the outer tubes T, and are removed together with clips 64 for refilling the tubes.

It will be appreciated that the tubes T could be directly refilled in which case the use of the inner pre-loaded tubes would not be necessary.

As indicated above, the motor M drives the tube chain through a controllable transmission, the motor itself running continuously when the machine is in use. In the illustrated embodiment, the controllable transmission includes an air clutch 26 controlled by a clutch solenoid CS both mounted at the top of the housing adjacent to the motor (Fig. 1). The air clutch is connected to an air source by conduits 70, through air control valve 71, condensation trap 72, a valve controlled by solenoid CS, and intake conduit 73.

Figure 10:
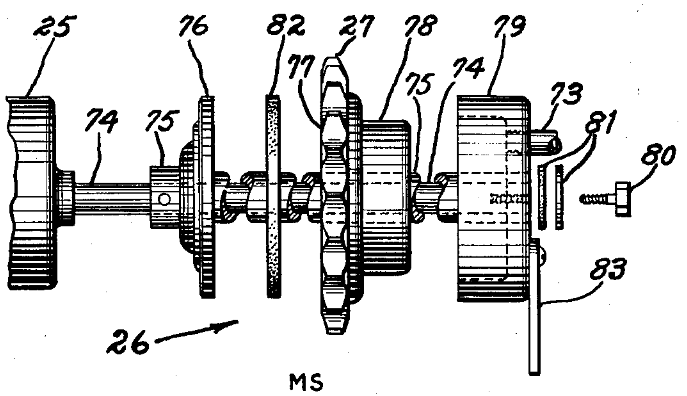
Fig. 10 is an exploded view of an air clutch used in the wire feeding mechanism.

An exploded view of the air clutch is illustrated in Fig. 10. Shaft 74 extends from gear reduction housing 25 and has non-rotatably secured thereto an outer concentric shaft 75 to which is fixedly secured drive clutch disc 76. Driven clutch disc 77 is slideably mounted on shaft 75, and is formed integrally with chain sprocket 27 along its periphery and an air piston 78 projecting at the end opposite to the clutch discs. An air cylinder 79 is fixed to shaft 74 by a bolt 80 engaging a threaded aperture in the end of shaft 74 after having passed through a pair of leather washers 81. A floating leather disc 82 is interposed between clutch discs 76 and 77.

Piston 78 and cylinder 79 form an expansible air chamber, and as air under pressure is introduced therein through conduit 73 under control of clutch solenoid CS, driven disc 77 is coupled to driving disc 76 through the leather disc 82. A leg 83, fastened at one end to cylinder 79 and at the other end to the housing 2, assists in supporting the clutch assembly on the housing.

Also mounted on top of the housing are relay R and time delay relay TDR which are in the electrical circuit controlling the means moving the tube chain for indexing same one at a time into alignment with the access opening in the housing. The door 10, when raised, conditions the mechanism for operation and, when released, initiates the operation. To terminate operation of the moving means, a limit switch LS is disposed within the housing with its actuator 90 in the path of movement of either tubes T, or projections extending from grooved disc 41 or 43, the former arrangement being illustrated in Fig. 1. The limit switch LS senses the movement of the tubes and terminates operation of the moving means after the next succeeding tube has been indexed into alignment with the access opening.

To supersede control of the means for controlling the indexing operation, a mushroom type switch MS is provided located at the top of the housing. Switch MS, as will be described in the discussion of the electrical circuitry, enables the operator assembling the harness to advance the tube chain to any desired position.

A starter switch SS controls the overall operation of the machine and may similarly be mounted on top of the housing.

Figure 11:
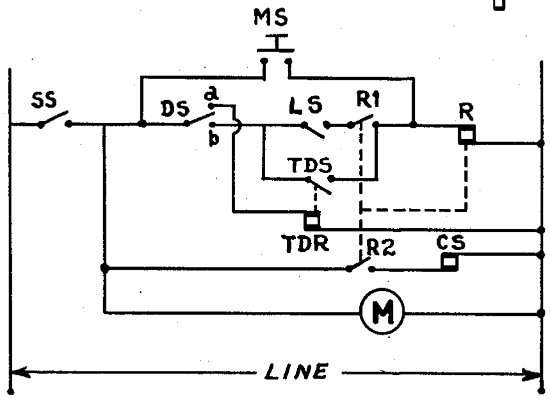
Fig. 11 is a schematic diagram of the electrical circuit controlling the operation of the wire feeding apparatus.

The operation of the apparatus will now be described with specific reference to Fig. 11 illustrating a schematic diagram of the electrical circuitry. The motor M is in continuous operation whenever the machine is in use, and is therefore connected across the line in series with starter switch SS. The clutch solenoid CS, which controls the transmission from the motor to the chain drive, is controlled by contacts R2 of relay R. Relay R has another set of contacts R1 in series with the relay, which are also closed when relay R is energized as indicated schematically by the dotted lines in Fig. 11. The switch DS actuated by door 10 has two positions; in the raised position of the door, contact *a* is closed; and in the normal, lowered position of the door, contact *b* is closed. Closure of contact *a* energizes time delay relay TDR to close its contacts TDS. Contact *b* establishes a parallel circuit to relay R through limit switch LS and contacts R1. Limit switch LS is normally open in any indexed position of the tube chain and closes as soon as the tube chain starts to move. Mushroom switch MS supersedes control of the door switch DS by establishing another parallel circuit to relay R.

To start the machine, switch SS is closed thereby connecting the motor M across the line for continuous operation. The door 10 would normally be closed; accordingly, contact *b* of switch DS would be connected to the line. Also, the tube chain would normally be in an indexed position, and switch LS would accordingly be open. Relay R, time delay relay TDR, and clutch solenoid CS are unenergized.

The operator raises door 10 to procure a wire from the tube aligned therewith. Raising of door 10 actuates switch DS to engage contact *a* thereof, thus energizing time delay relay TDR to close its contacts TDS. This conditions the electrical circuit for operating clutch solenoid CS, but does not yet energize CS since switch DS is not in the *b* position to actuate relay R and its contacts R2. After the wire has been removed, the door is released actuating DS to its *b* position. Contacts TDS are still closed, however, since TDR releases a predetermined time after its circuit is opened. Relay R is therefore energized by the circuit from one side of the line, SS, contact *b* of DS, TDS, R, and the other side of the line. Relay R closes its contacts R1 and R2, the latter completing a circuit to energize clutch solenoid CS to start the advancement of the tube chain. As the tube chain begins advancing, limit switch LS is closed. During the advancement, the time delay of relay TDR expires and TDS opens; however, relay R remains energized by the parallel circuit including LS and R1. As the tube chain reaches its next indexed position, LS is opened thus de-energizing R and CS, decoupling the tube chain from the motor drive.

Referring to Fig. 1, tube T1, at the time a wire was procured therefrom through the access opening, would have been in the position illustrated in this figure as being occupied by tube T2. After the tube chain has been advanced one position, tube T2 would be alignment with the access opening and tube T1 would be in alignment with the information display opening, since the latter opening is displaced one position relative to the access opening in the direction of advancement of the tube chain. Thus, information concerning the wire procured before indexing of the tube chain will be displayed after the indexing. This enables the assembler to check the wire for possible defects and/or to bring it in front of the harness board HB preparatory to placing it in the exact position specified by the instruction displayed after indexing. In the event the wire removed is defective, or the assembler for any other reason wants to procure another wire from tube T1 after it has been indexed, a panel 23 bordering the opening is supported by a pair of lugs 24, so that it can be easily removed (see Figs. 3 and 4). Panel 23 is disposed below the access opening and in alignment with the next-indexed position of the tube chain, that is on the same longitudinal axis as the instruction display opening.

The invention has been described as embodied in wire feeding apparatus for use in connection with assembling harnesses since it has been found especially useful for this purpose, but other applications of the improved article feeding apparatus will be readily apparent. Many modifications in the apparatus will also be obvious to those skilled in the art coming within the spirit and scope of the invention as defined in the following claims.

What is claimed is:

1. Article feeding apparatus comprising a housing having an opening, a normally closed door covering the opening, a series of article carriers disposed within the housing and movable to successively present the articles carried thereby accessible through the opening when the door is open, means including a continuously running motor and a clutch for driving said article carriers, means controlling said clutch to effect engagement thereof, so that said article carriers will be indexed successively into alignment with the opening, electrical switching means actuated by opening said door for conditioning said clutch control means for operation and actuated by closing said door for operating said clutch control means, and means responsive to the movement of said article carriers one indexed position for terminating operation of said clutch control means.

2. Article feeding apparatus comprising a housing having an opening therein, a normally closed door covering the opening, an endless chain of article carriers disposed within the housing and movable to successively present the articles carried thereby accessible through the opening when the door is open, means including a continuously running motor and a clutch for driving said chain, means controlling said clutch, and an electrical circuit for controlling said clutch control means, said electrical circuit including a two-position switch movable to one position by opening said door to condition the circuit for operation of said clutch control means and movable to a second position by closing said door to actuate said clutch control means initiating operation of said clutch, and a further switch responsive to the movement of said chain to terminate operation of said clutch when the chain has advanced one indexed position.

3. Wire feeding apparatus especially useful in assembling electrical harnesses comprising a housing having an opening therein, a normally closed door covering the opening, an endless chain of wire-carrying tubes disposed within the housing and movable to successively present the wires carried thereby accessible through the opening when the door is open, means including a continuously running motor and a clutch for driving said chain, and an electrical circuit including a solenoid for controlling said clutch, said circuit comprising a two-position switch movable to one position by opening said door to condition the circuit for energization of said solenoid and movable to a second position by closing said door to energize said solenoid, and a further switch responsive to the movement of said chain to de-energize said solenoid when the chain has advanced one indexed position.

4. Wire feeding apparatus as defined in claim 3, wherein the housing is formed with a second opening, and said wire-carrying tubes bear indicia relating to the wires carried thereby viewable through the second opening.

5. Wire feeding apparatus as defined in claim 4, wherein the second housing opening is displaced from the first opening one indexed position in the direction of advancement of the chain so that the indicia on a tube will be viewable through the second opening when the tube has advanced one indexed position, and further including a removable panel bordering the first-mentioned housing opening and in the same indexed position of the tubes as the second housing opening.

6. Wire feeding apparatus especially useful for assembling electrical harnesses comprising a housing having a first opening and a second opening, a normally closed door covering said first opening, a chain of wire-carrying tubes disposed within the housing and movable to successively present the wires carried thereby accessible through said first opening when the door is opened, electromotive means for driving said chain, electrical means responsive to first opening and then closing said door for initiating operation of said drive, and means responsive to the movement of said chain one indexed position for terminating operation of said drive, the second opening of said housing being displaced from the first opening one indexed position in the direction of movement of the chain, said wire-carrying tubes bearing indicia relating to the wires carried thereby viewable through said second opening when its tube has moved the one indexed position.

References Cited in the file of this patent

UNITED STATES PATENTS

| | | |
|---|---|---|
| 427,806 | Statler | May 13, 1890 |
| 919,927 | Neumann | Apr. 27, 1909 |
| 1,355,488 | McKenney | Oct. 12, 1920 |
| 1,403,599 | Goudeau | Jan. 17, 1922 |
| 1,693,458 | Patterson | Nov. 27, 1928 |
| 1,804,051 | Fortune | May 5, 1931 |
| 1,978,205 | Ide | Oct. 23, 1934 |
| 2,034,517 | Keith | Mar. 17, 1936 |
| 2,289,807 | Schaevitz | July 14, 1942 |
| 2,497,748 | Von Stoeser | Feb. 14, 1950 |
| 2,652,301 | Skillman | Sept. 15, 1953 |
| 2,655,242 | Chalfin | Oct. 13, 1953 |

FOREIGN PATENTS

| | | |
|---|---|---|
| 47,576 | Norway | Feb. 24, 1930 |